(12) United States Patent
Baca et al.

(10) Patent No.: US 10,898,933 B2
(45) Date of Patent: Jan. 26, 2021

(54) OLEOPHOBIC GLASS ARTICLES

(71) Applicant: Corning Incorporated, Corning, NY (US)

(72) Inventors: Adra Smith Baca, Rochester, NY (US); David Eugene Baker, Bath, NY (US); Prantik Mazumder, Ithaca, NY (US); Mark Alejandro Quesada, Horseheads, NY (US); Wageesha Senaratne, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 1088 days.

(21) Appl. No.: 13/905,367

(22) Filed: May 30, 2013

(65) Prior Publication Data
US 2013/0323466 A1 Dec. 5, 2013

Related U.S. Application Data

(60) Provisional application No. 61/653,444, filed on May 31, 2012.

(51) Int. Cl.
| | |
|---|---|
| C09D 5/16 | (2006.01) |
| B82Y 30/00 | (2011.01) |
| C03C 17/23 | (2006.01) |
| C03C 17/30 | (2006.01) |
| B08B 17/06 | (2006.01) |
| B05D 5/00 | (2006.01) |
| C03C 17/245 | (2006.01) |

(52) U.S. Cl.
CPC .............. B08B 17/065 (2013.01); B05D 5/00 (2013.01); C03C 17/245 (2013.01); *C03C 2217/213* (2013.01); *C03C 2217/76* (2013.01); *C03C 2218/33* (2013.01); *C03C 2218/34* (2013.01); *Y10T 428/24355* (2015.01)

(58) Field of Classification Search
CPC ....... C03C 17/23; C03C 17/245; C03C 17/30; C03C 2204/00; C03C 2204/08; C03C 2217/21–2217/244; C03C 2217/76; C09D 5/1681; G02B 27/0006; B08B 17/065; B82Y 30/00; Y10T 428/24355
USPC ........ 428/137, 141, 167, 172, 426, 432, 702
See application file for complete search history.

(56) References Cited

U.S. PATENT DOCUMENTS

| 8,795,812 B2 | 8/2014 | Mazumder | |
|---|---|---|---|
| 2006/0286370 A1* | 12/2006 | Chiu | ............................ 428/336 |
| 2007/0031639 A1* | 2/2007 | Hsu | .......................... B05D 5/08 |
| | | | 428/141 |

(Continued)

OTHER PUBLICATIONS

Burmeister et al; "Colloid Monolayers as Versatile Lithographic Masks"; Langmuir; 1997; 13; pp. 2983-2987.

(Continued)

*Primary Examiner* — Joanna Pleszczynska
(74) *Attorney, Agent, or Firm* — Kevin M. Johnson

(57) ABSTRACT

Described herein are glass substrates having oleophobic surfaces that are substantially free of features that form a reentrant geometry. The surfaces can include a plurality of gas-trapping features, extending from the surface to a depth below the surface, that are substantially isolated from each other. The gas-trapping features are capable of trapping gas below any droplets that are contacted with the surface so as to prevent wetting of the surface by the droplets.

19 Claims, 12 Drawing Sheets

(a)

(b)

(56) References Cited

U.S. PATENT DOCUMENTS

| | | | |
|---|---|---|---|
| 2007/0231542 A1* | 10/2007 | Deng | B08B 17/06 428/141 |
| 2008/0047940 A1 | 2/2008 | Li et al. | |
| 2008/0286548 A1 | 11/2008 | Ellison et al. | |
| 2009/0142568 A1 | 6/2009 | Dejneka et al. | |
| 2009/0215607 A1 | 8/2009 | Dejneka et al. | |
| 2009/0220761 A1 | 9/2009 | Dejneka et al. | |
| 2009/0255266 A1* | 10/2009 | Varanasi | C23C 30/00 60/752 |
| 2010/0009154 A1 | 1/2010 | Allan et al. | |
| 2010/0028607 A1 | 2/2010 | Lee et al. | |
| 2010/0033818 A1* | 2/2010 | Petcavich | B08B 17/06 359/507 |
| 2010/0035038 A1 | 2/2010 | Barefoot et al. | |
| 2010/0279068 A1* | 11/2010 | Cook et al. | 428/141 |
| 2010/0304086 A1* | 12/2010 | Carre | B82Y 20/00 428/149 |
| 2011/0045961 A1 | 2/2011 | Dejneka et al. | |
| 2011/0201490 A1 | 8/2011 | Barefoot et al. | |

OTHER PUBLICATIONS

Frey et al; "Ultraflat Nanosphere Lithography: A New Method to Fabricate Flat Nanostructures"; Adv. Mater. 2000, 12, No. 20, Oct. 16.

Inns et al; "Wafer Surface Charge Reversal as a Method of Simplifying Nanosphere Lithography for Reactive Ion Etch Texturing of Solar Cells"; Advances in Optoelectronics; vol. 2007; Article ID 32707; 4 Pages.

Kosiorek et al; "Shadow Nanosphere Lithography: Simulation and Experiment"; Nano Letters; 2004; vol. 4, No. 7; pp. 1359-1363.

Kuo et al; "Fabrication of Large-Area Periodic Nanopillar Arrays for Nanoimprint Lithography Using Polymer Colloid Masks"; Advanced Materials; 2003; 15; No. 13; Jul. 4.

Li et al; "Fabrication of Highly Ordered Metallic Arrays and Silicon Pillars With Controllable Size Using Nanosphere Lithography"; Physica E: Low-Dimensional Systems and Nanostructures; vol. 41, Issue 8, Aug. 2009; pp. 1600-1603.

Winzer et al; "Fabrication of Nano-Dot and Nano-Ring-Arrays by Nanosphere Lithography"; Appl. Phys. A 63; 617-619 (1996).

* cited by examiner

OLEOPHOBIC GLASS ARTICLES

CROSS-REFERENCE TO RELATED APPLICATIONS

The present application claims the benefit of priority of U.S. Patent Application Ser. No. 61/653,444 filed on May 31, 2012 which is hereby incorporated by reference in its entirety as if fully set forth below.

TECHNICAL FIELD

The present disclosure relates generally to fingerprint-resistant or anti-fingerprint glass articles. More particularly, the various embodiments described herein relate to glass articles having surfaces that are both free of multi-scale structures (e.g., reentrant, overhang, fractal, or other like structures) and are oleophobic or super-oleophobic, as well as to methods of making and using the glass articles.

BACKGROUND

Non-wetting substrates that are formed through surface chemistry and surface texturing are increasingly being employed in applications such as micro-fluidics, MEMS, hand-held devices, touch screen applications, and the like, in which a surface that is repellant to water and/or organic fluids (i.e., oils) is desired. The non-wetting characteristics of a substrate, such as, for example, a glass substrate, are usually classified in terms of the static contact angle of a small liquid droplet placed on the substrate, wherein the dimension of the droplet is smaller than the capillary length of the liquid. If the working liquid is an oil, the substrate is characterized as being oleophilic (i.e., wetting) if the static contact angle between the oil droplet and the substrate is less than 90°, oleophobic (i.e., non-wetting) if the static contact angle between the oil droplet and the substrate is greater than 90°, or superoleophobic if the static contact angle between the oil droplet and the substrate is greater than 150°.

Surface roughness can, in some instances, enhance the wetting and/or non-wetting characteristics of a substrate. If the static contact angle of a liquid on a flat surface is greater than 90° or if the original flat surface is non-wetting with respect to the liquid, that surface could be made even more non-wetting with respect to the liquid by adding roughness to the surface. Certain material surfaces, such as those fluoropolymers commercially available under the TEFLON mark, are non-wetting with respect to water (contact angle ~110° even when the surface is perfectly flat. Such substrates can be made superhydrophobic by providing the substrate surface with a rough geometry that may include simple geometric structures, such as cones, cylinders, posts, or the like.

In contrast, synthetic or naturally occurring oleophobic substrates that are perfectly flat are generally not known. The surface tension of oils and other organic liquids is very low, and the contact angle of oil on a perfectly flat surface is less than 90° (i.e., the perfectly flat surface is oleophilic). Accordingly, the oleophobic state and, particularly, the superoleophobic state are metastable on simple surface geometries such as cones, posts, cylinders, and the like. This metastability leads to a transition on simple rough surfaces to the oleophilic or wetting state. The few known cases of oleophobic and superoleophobic substrates are made through creation of multiscale structures with reentrant, overhang, fractal or other like geometries.

BRIEF SUMMARY

Oleophobic glass articles and methods of making and using the glass articles are described.

One type of oleophobic article includes a glass substrate and a patterned coating that is disposed on a surface of the glass substrate and that comprises a plurality of non-interacting gas-trapping features.

In certain implementations of this type of oleophobic article, each gas-trapping feature can include an opening in an outer surface of the patterned coating that extends to a depth below the outer surface. The outer surface, in these implementations, can have an open fraction of at least 0.40. Each opening can have a cross-sectional dimension a, where an average a is about 10 nanometers to about 100 micrometers. In addition, each opening can extend into the patterned coating to a depth H, where an average H is about 10 nanometers up to about 100 micrometers. Further, adjacent gas-trapping features in the patterned coating can be separated by a distance b, where an average b is about 10 nanometers to about 50 micrometers.

The glass substrate in this type of oleophobic article can be an alkali aluminosilicate glass. In addition, the patterned coating can be formed from an oxide material.

In certain implementations of this type of oleophobic article, the oleophobic article is hydrophobic. It is also possible for the oleophobic article to exhibit a total reflectance over a visible light spectrum that is lower than a total reflectance of the glass substrate without the patterned coating disposed thereon.

Another type of oleophobic article includes a chemically strengthened alkali aluminosilicate glass substrate and a patterned coating of an oxide material that is disposed on a surface of the chemically strengthened alkali aluminosilicate glass substrate and that includes a plurality of non-interacting gas-trapping features. Each gas-trapping feature includes an opening in an outer surface of the patterned coating that extends to a depth below the outer surface, such that the outer surface has an open fraction of at least 0.40; each opening has a cross-sectional dimension a, where an average a is about 10 nanometers to about 100 micrometers; each opening extends into the patterned coating to a depth H, where an average H is about 10 nanometers up to about 100 micrometers; and adjacent gas-trapping features in the patterned coating are separated by a distance b, where an average b is about 10 nanometers to about 50 micrometers.

In certain implementations of this type of oleophobic article, the oleophobic article is hydrophobic. It is also possible for the oleophobic article to exhibit a total reflectance over a visible light spectrum that is lower than a total reflectance of the glass substrate without the patterned coating disposed thereon.

One type of method of making an oleophobic article includes providing a glass substrate and forming a patterned coating on a surface of the glass substrate, such that the patterned coating includes a plurality of non-interacting gas-trapping features.

In certain implementations of this type of method, forming the patterned coating involves disposing a mask on the surface of the glass substrate, disposing a coating on the mask-covered surface, and removing the mask from the coated surface such that any remaining coating is the patterned coating, where each gas-trapping feature of the patterned coating comprises an opening in an outer surface of the patterned coating that extends to a depth below the outer surface. In some of these implementations, disposing the mask involves disposing a plurality of particles on the surface of the glass substrate. In others, disposing the mask can further involve reducing a size of the particles in the plurality of particles. Reducing the size of the particles can entail etching the plurality of particles. Removing the mask can entail selectively removing the plurality of particles from the coated surface of the glass substrate regardless of whether or not the size of the particles has been reduced by a size-reducing step.

These and other aspects, advantages, and salient features will become apparent from the following detailed description, the accompanying drawings, and the appended claims.

BRIEF DESCRIPTION OF THE DRAWINGS

FIG. 6 is a plot of contact angles calculated for Cassie-Baxter (C) and Wenzel (W) states as a function of the ratio b/a.

DETAILED DESCRIPTION

Figure 1:
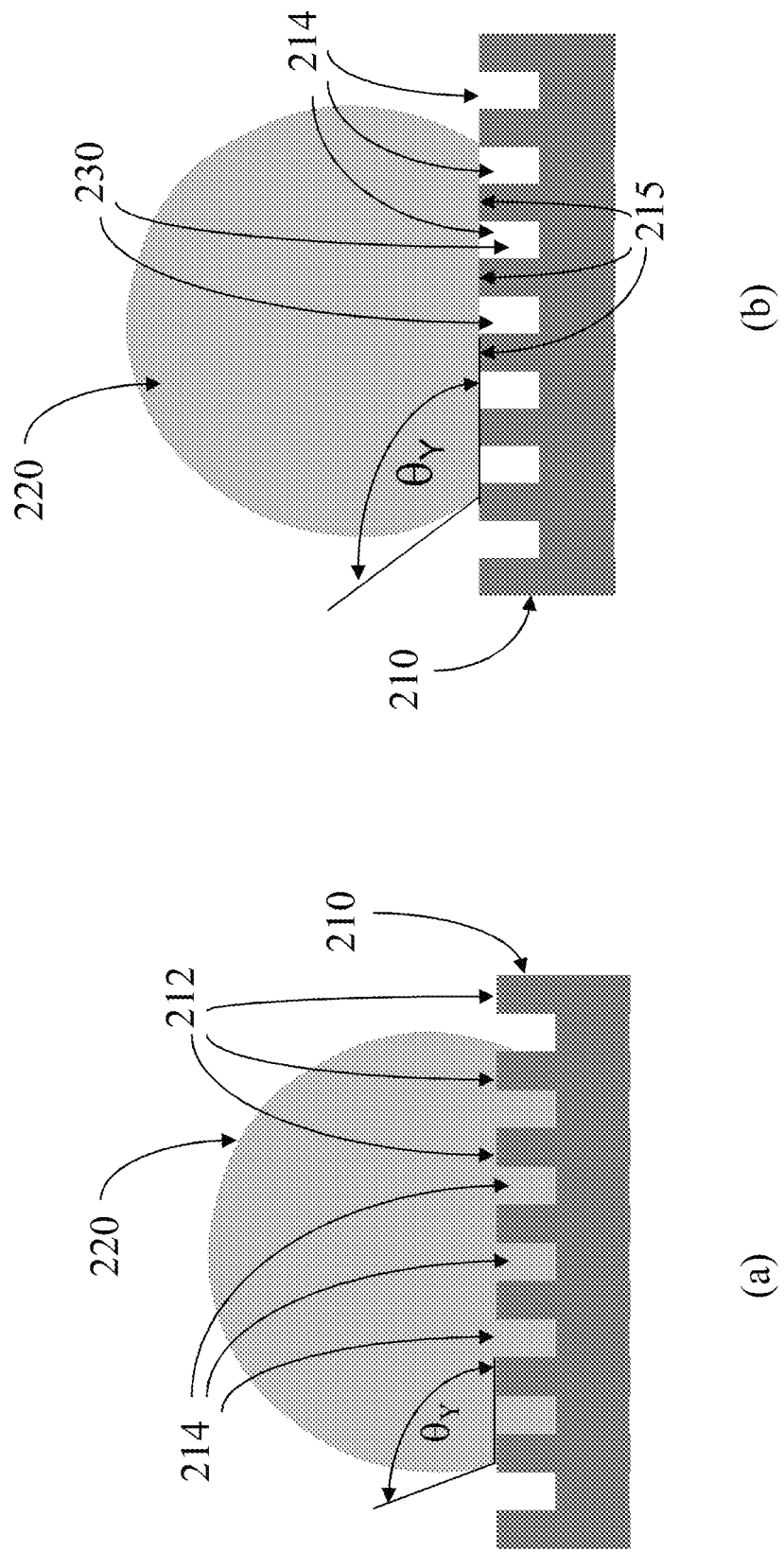
FIG. 1a is a schematic cross-sectional representation of the Wenzel state.
FIG. 1b is a schematic cross-sectional representation of the Cassie-Baxter state.

Referring now to the figures, wherein like reference numerals represent like parts throughout the several views, exemplary embodiments will be described in detail.

Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the term "oleophilic" refers to the state in which the contact angle (CA) between a droplet of oil and a solid surface is less than 90°. As used herein, the term "oleophobic" refers to the state in which the contact angle (CA) between a droplet of oil and a solid surface is greater than or equal to 90°, and the term "superoleophobic" refers to the state in which the contact angle between a droplet of oil and a solid surface is greater than 150°.

The contact angle of a liquid on a surface of a substrate depends on the surface energy of the glass substrate and the roughness of the surface. If the surface is perfectly smooth, then the contact angle depends only on the surface energy of the surface and in this case the static CA is determined by the Young force balance condition at the triple line according to the equation:

$$\cos\theta_Y = \frac{\gamma_{SV} - \gamma_{SL}}{\gamma_{LV}} \qquad (1)$$

where $\theta_Y$ is the Young contact angle on a perfectly flat surface, $\gamma_{SV}$ is the surface energy of the solid-vapor interface, $\gamma_{SL}$ is the interfacial energy between the liquid and solid, and $\gamma_{LV}$ is the liquid-vapor surface energy (also known as the surface tension of the liquid in the atmosphere of a specific vapor phase). From the above expression, it is clear that a very low value of $\gamma_{SV}$ or surface energy of the solid surface is required to produce a super non-wetting condition on a perfectly flat surface. The maximum CA values obtained on flat surfaces of natural and synthetic substrates are about 120° for water and about 70-80° for oil.

Surface roughness can enhance either wetting or non-wetting characteristics of a substrate. Assuming that the size of a liquid droplet is much larger than that of the roughness features (e.g., pillars, posts, protrusions, pits, depressions and the like), a liquid droplet placed on a roughened surface can assume either of two limiting configurations: the Wenzel state (FIG. 1a) or the Cassie-Baxter state (FIG. 1b). In the Wenzel state, the liquid droplet 220 fully invades the space 214 between the pillars or protrusions 212 and all the solid surface underneath the liquid drop 220 is wetted by the liquid. The contact angle $\theta_W$ in this state is given by the well-established Wenzel model:

$$\cos\theta_W = r_W \cos\theta_Y \qquad (2)$$

where $r_W$ is the roughness factor. Roughness factor $r_W$ is defined as the ratio between the actual wetted area and the projected planar area, and is therefore always greater than unity. A direct consequence of the Wenzel model is that if the original substrate is non-wetting with respect to a liquid, then the roughened surface is even more non-wetting with respect to the same liquid. That is, if the flat surface contact angle $\theta_Y$ is greater than 90°, then the roughened surface contact angle $\theta_W$ is greater than $\theta_Y$ (90°<$\theta_Y$<$\theta_W$). By creating roughness on an intrinsically hydrophobic substrate such as polytetrafluoroethane (PTFE) (e.g., sold under the TEFLON mark by DuPont) or a surface coated with polyfluorosilanes such as those sold as DC2604, manufactured by Dow Corning, it is possible to achieve a super-hydrophobic state in the Wenzel state. Conversely, if the original substrate is wetting with respect to the liquid, then the roughened surface exhibits even greater wetting with respect to the liquid. That is, if the flat surface contact angle $\theta_Y$ is less than 90°, then the roughened surface contact angle $\theta_W$ is less than $\theta_Y$ (90°>$\theta_Y$>$\theta_W$). In the case of oil, there is no known material for which the Young contact angle $\theta_Y$ on a flat surface is greater than 90° (even a smooth TEFLON PTFE surface has a contact angle of about 80°). As long as the Young contact angle $\theta_Y$ of an oil droplet on a substrate is less than 90°, an oleophobic state cannot be achieved by roughening the substrate if the oil droplet assumes the Wenzel state on the rough substrate.

Alternatively, a liquid droplet can also assume the Cassie-Baxter configuration shown in FIG. 1b, in which droplet 220 sits on the top of the rough surface 215 without invading the space 214 between pillars/protrusions. Much of the liquid surface thus can be suspended in air without touching any solid surface. The Cassie-Baxter state is also known as the composite state, as a composite interface, comprising liquid-solid and liquid-air interfaces which coexist to create the overall interface shape. In this instance, a very large contact angle can be attained if much of the liquid surface can be suspended in air. The contact angle $\theta_{CB}$ in this configuration is expressed as:

$$\cos\theta_{CB} = -1 + f(1 + r_f \cos\theta_Y) \qquad (3)$$

where f is the fraction of solid-liquid interface (the fraction of the total interface that is a solid-liquid interface) and $r_f$ is the roughness factor of the wetted area. As can be seen from equation (3), a lower solid-liquid interface fraction f results in a greater contact angle $\theta_{CB}$. In the extreme case where f=0, the contact angle is 180° and the situation corresponds to the case in which to the liquid droplet is fully suspended in air. In the other extreme case where f=1, the configuration state corresponds to the fully wetted Wenzel state.

The Cassie-Baxter state shown in FIG. 1b is unconditionally unstable on regular geometric surfaces if the Young contact angle $\theta_Y$ on a flat substrate surface is less than 90°, such as, for example, in the case of oil. If the Young contact angle $\theta_Y$ on a flat surface is greater than 90° (such as, for example, for water), then the Cassie-Baxter state is either metastable or stable, depending on size of the roughness features the design parameters.

Figure 2:
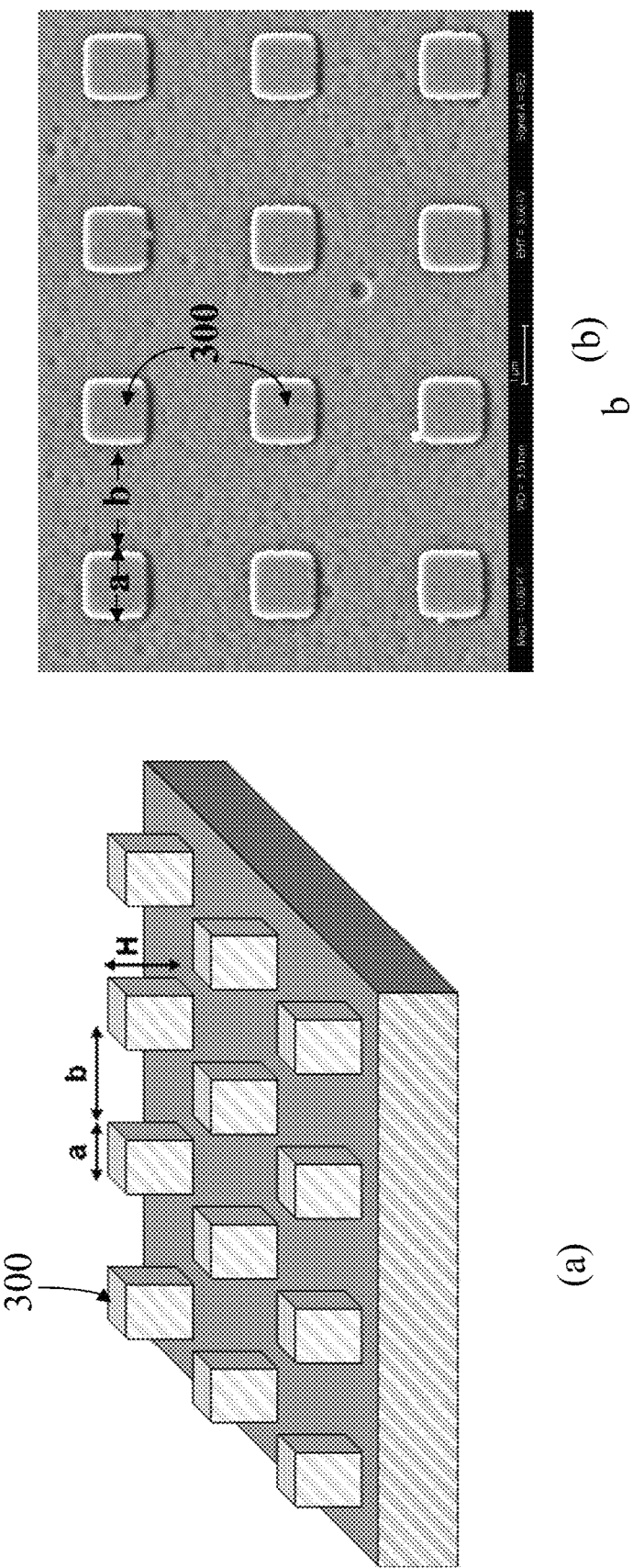
FIG. 2a is a schematic representation of a roughened glass surface having a plurality of surface protrusions.
FIG. 2b is a scanning electron microscope (SEM) image of a top view of a roughened glass having a plurality of surface protrusions.

Since the Young contact angle $\theta_Y$ of oil is less than 90° on flat surfaces (the maximum Young CA that has been achieved is approximately 80°), it is difficult to achieve the Cassie-Baxter state on simple rough surfaces, such as those protrusions 300 that are schematically shown in a perspective view in FIG. 2a and in FIG. 2b, which is a scanning electron microscope (SEM) image of a top view of a substrate. Oil has a natural tendency to invade the inter-pillar spaces (b in FIGS. 2a and 2b) and transition into the Wenzel state. This transition from the Cassie-Baxter state to the Wenzel state is known as the wetting transition. As previously described herein, if the Young contact angle $\theta_Y$ is less than 90°, then the Wenzel state contact angle $\theta_W$ will be even smaller. The creation of an oleophobic or super-oleophobic surfaces through surface roughening therefore poses a serious challenge.

Accordingly, a glass substrate or article having a surface that exhibits oleophobic properties (i.e., the surface is oleophobic) is provided. In some embodiments, the surface of the glass substrate is superoleophobic.

The surface of the glass substrate is substantially free of structures that provide the surface with a reentrant geometry. Surfaces having a reentrant geometry typically include a protruding portion configured to protrude toward a liquid and a reentrant portion opposite the protruding portion. Such reentrant geometries provide metastability to the composite liquid-solid state and prevent or slow the transition of fluid droplets on a roughened surface from a Cassie-Baxter state to a Wenzel state. Reentrant geometries and structures can include, for example, hierarchal geometries which in turn include features, particles, or coatings that create protuberances on the surface, fractal geometries, and overhanging structures (e.g., nano- or micro-nails, reverse nano- and micro-nails, or the like).

Figure 3:
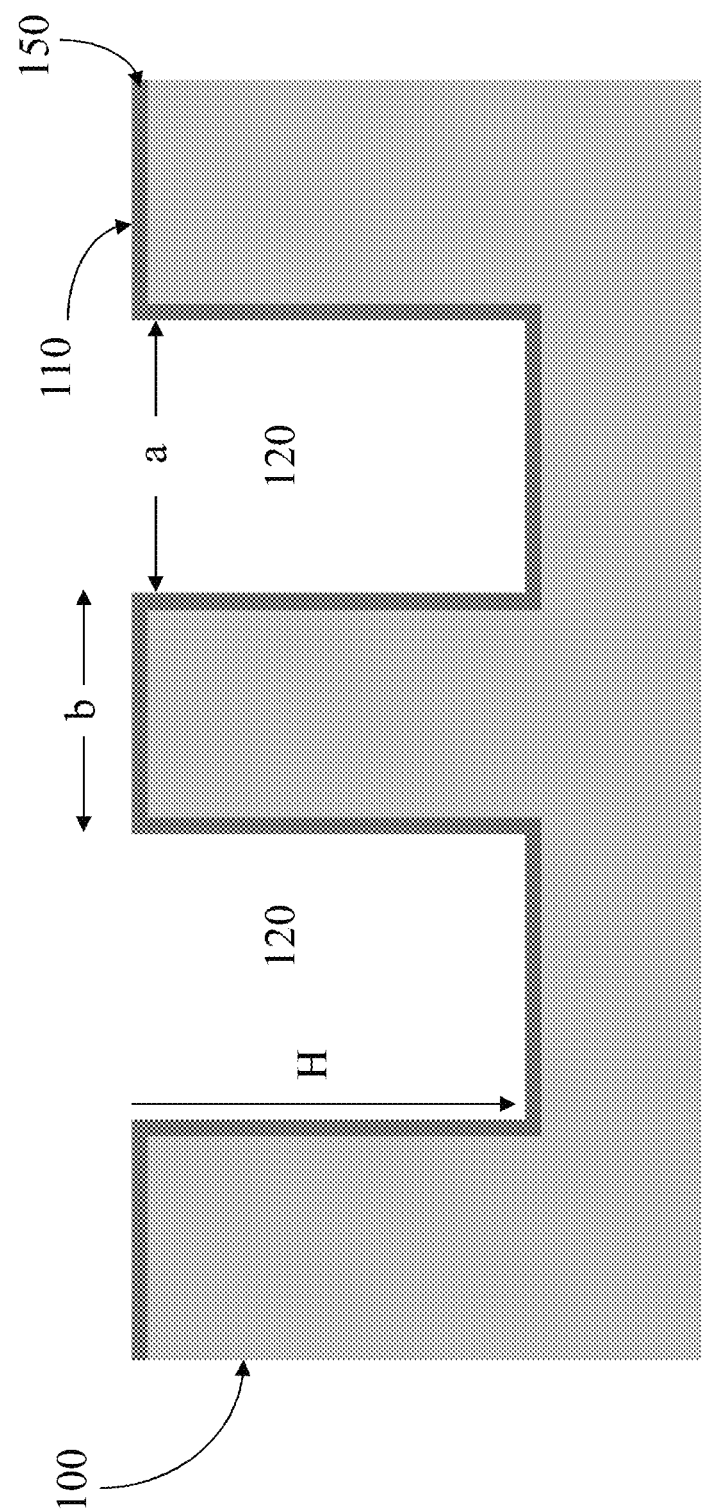
FIG. 3 is a schematic cross-sectional representation of a glass substrate, having gas-trapping features.

In one embodiment, the glass substrate comprises a plurality of gas-trapping features. A schematic cross-sectional view of the glass substrate, showing such gas-trapping features, is shown in FIG. 3. Each of the gas-trapping features 120 has a dimension (e.g., a radius for circular/cylindrical features as shown in FIG. 3, a side for a rectangular or square feature, or a diagonal for other polygonal or irregular features) a, that is open to the surface 110 of glass substrate 100, and extends to a depth H below the surface 110. Adjacent gas-trapping features 120 are separated by distance b. The gas-trapping features 120 are substantially isolated from each other. That is, although the gas-trapping features 120 may be in fluid communication with each other through porosity that is inherently present in the glass substrate 100 (porosity of the glass substrate is dependent on the nature or composition of the glass substrate), the gas-trapping features 120 are not in fluid communication with each other, aside from their intersecting surface 110 of the glass substrate 100, nor is such fluid communication actively or intentionally established. Gas-trapping features 120 include, but are not limited to, cavities, pores, depressions, holes, or the like that are substantially isolated from each other. In some embodiments, the gas-trapping features 120 each have at least one wall and, optionally, a base or floor that together define a cavity that is isolated and does not interact with other cavities or other gas-trapping features present on the surface 110 of the glass substrate 100.

The gas-trapping features 120 physically trap gas when a liquid drop 130 is located on the surface 110, covering and partially invading the features 120. This effect is schematically shown in FIGS. 4a and 4b for instances in which the liquid meniscus 135 either has an upwardly concave shape (FIG. 4b), such as that observed for water, and a downwardly concave shape, such as observed for oils (FIG. 4a), respectively. In the absence of any pathway to the atmosphere, gas 140 cannot escape from the gas-trapping feature 120 and becomes more gradually compressed as the liquid droplet 130 penetrates into space within the gas-trapping feature 120. The vertical component of the surface tension force of the liquid droplet 130 is directed upward in the case of water (FIG. 4b), and downward in the case of oil (FIG. 4a). As the meniscus 135 starts to invade the gas-trapping feature 120 to a depth h, the gas 140 remains physically trapped in the absence of any pathway to the atmosphere above the glass substrate 100, and is gradually compressed. This effect is contrasted with that observed where the surface of the glass substrate comprises a structure having interconnected protrusions, depressions, and/or simple geometric structures, such as the protrusions or posts 300 shown in FIGS. 2a and 2b. In this instance, an interconnected pathway between the pillars, posts, grooves, cavities, depressions, pores, or the like is always present. Consequently, the gas molecules underneath the meniscus are eventually displaced, allowing for further invasion of the depressions or cavities, especially in the case of oil, where the liquid meniscus is downwardly concave and the vertical component of the surface tension force is directed downward.

Gas molecules in the gas-trapping features 120 actively support the stability of the meniscus 135. As the meniscus 135 penetrates into a gas-trapping feature 120, such as a cavity or the like, the gas molecules are compressed, creating a situation that can be likened to a piston-cylinder assembly. As the meniscus 135 moves further into the gas-trapping feature 120, gas 140 is further compressed, and the pressure of the gas 140 in the gas-trapping feature 120 correspondingly increases. The pressure increase provides an opposing force to the motion of the meniscus 135, thus preventing full penetration of the meniscus 135 into the gas-trapping feature 120. Equilibrium is reached when the pressure of the compressed gas 140 balances the capillary pressure. A static condition could be achieved without the need for a reentrant or overhang geometry, even in those instances where the meniscus 135 is downwardly concave, as shown in FIG. 4a.

Figure 5:
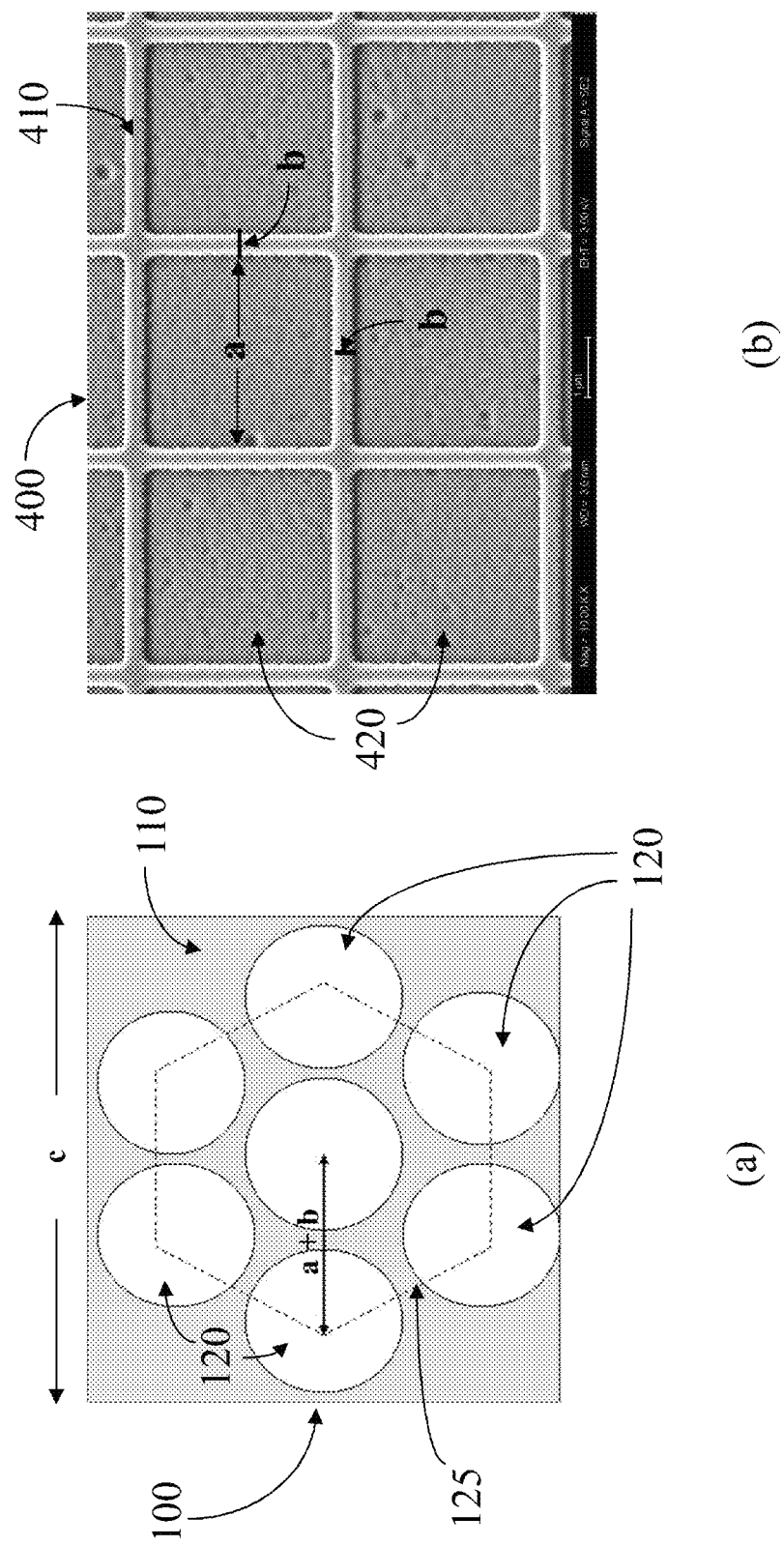
FIG. 5a is a schematic top view of an oleophobic surface comprising an array of non-interacting, cylindrical gas-trapping holes.
FIG. 5b is a scanning electron microscope image of a glass substrate having an array of square gas-trapping features.

A top view of a non-limiting example of a glass substrate 100 having an oleophobic surface is schematically shown in FIG. 5a. The surface 110 comprises an array of non-interacting, cylindrical gas-trapping holes 120 arranged in a hexagonal lattice 125. Each of the holes 120 has radius a and height H. Adjacent holes 120 are separated by distance b. A side view of the cylindrical holes 120 is schematically shown in FIG. 3. While the embodiment shown in FIG. 5a shows an ordered array of circular or cylindrical holes, it is not necessary or required that the plurality of gas-trapping features 120 be arranged in such an ordered array or be circular/cylindrical in shape. The plurality of gas-trapping features 120 can, in some embodiments, be randomly arranged on or within the surface 100. In some embodiments, the dimensions a, b, H of the gas-trapping features 120 can vary from one feature to the next. In addition, the geometry of the gas-trapping features 120 is not limited to circular/cylindrical shapes. The gas-trapping features 120 may be configured in other shapes, such as, but not limited to, irregular shapes, polygonal (e.g., trapezoidal, triangular, diamond, square, rectangular, and the like) shapes, or the like. A non-limiting example of a glass substrate having an array of square gas trapping features, mimicking the appearance of a "waffle," is shown in FIG. 5b. The glass substrate 400 comprises an array of gas-trapping features, which are square depressions 420 in the surface 410. The square depressions 420, each have a side a and depth H (not shown), and are separated from each other by distance b. The square depressions 420 also intersect the surface 410, extend downward from the surface 410, and are otherwise isolated from each other.

As used herein, the term "open fraction" refers to the fraction of the surface 110 that is open to the gas-trapping features 120. For example, for the substrate 100 shown in FIG. 5a, the total area of the surface 110 is $c^2$ and the total area of the surface 110 that is open to the gas-trapping features is $7\pi a^2$. For the substrate 100 shown in FIG. 5a, the open fraction f of the surface 110 is therefore given by the expression $(7\pi a^2)/c^2$.

The open fraction f of the surface 110 is at least about 0.40 and, in some embodiments, in a range from about 0.40 up to about 0.95, with the actual upper limit being set or determined by process capability and mechanical limits of the structure. In some embodiments, the open fraction f is greater than 0.70 and less than or equal to about 0.95. In other embodiments, the open fraction f is greater than 0.80 and less than or equal to about 0.95.

In some embodiments, the gas-trapping features 120, 420 have a dimension a (e.g., a radius, diameter, edge, or the like) at the surface 110, 410 that is in a range from about 10 nanometers (nm) up to about 100 micrometers (μm). In those embodiments in which the glass substrate 100, 400 is transparent, dimension a (e.g., a cross-sectional dimension, such as the length of a side of a rectangular or square feature (FIG. 5b) or radius of a circular or cylindrical feature (FIG. 5a)) is in a range from about 10 nm up to about 500 nm. In some embodiments, separation distance b between adjacent gas-trapping features 120, 420 is in a range from about 1 nm up to about 50 μm. The depth H of the gas-trapping features 120, 420, in some embodiments, is in a range from about 10 nm up to about 100 μm. In those embodiments in which the glass substrate 100, 400 is transparent, depth H is in a range from about 10 nm up to about 500 nm.

The glass substrate 100 can also include an optional low surface energy coating 150 disposed on the surface 110 and/or on/within the gas-trapping features 120. The coating 150, in some embodiments, comprises at least one of a fluoropolymer or a fluorosilane. Such fluoropolymers and fluorosilanes include, but are not limited to, TEFLON PTFE and commercially available fluorosilanes such as Dow Corning 2604, 2624, and 2634; DK Optool DSX™; Shintesu OPTRON™; heptadecafluoro silane (manufactured, for example, by Gelest); FLUOROSYL™ (manufactured, for example, by Cytonix); and the like. Such coatings can be applied to the surface 110 of the glass substrate 100 by dipping, vapor coating, spraying, application with a roller, or other suitable method known in the art to which this disclosure pertains.

If, for example, the liquid meniscus rested exactly on the top of the holes or cavities shown in FIGS. 3 and 5a without any penetration, the liquid droplet/meniscus would then correspond to the classical Cassie-Baxter state. The contact angle for the array of circular/cylindrical gas-trapping features shown in FIG. 5a would be given by equation (3), with:

$$f = 1 - \frac{2\pi}{\sqrt{3}} \frac{1}{(2+b/a)^2}, \quad (4)$$

and

-continued $$r_f = 1. \quad (5)$$

If the liquid in the droplet fully penetrated and completely filled up the cylindrical cavities and assumed the Wenzel configuration, then the contact angle for the array of circular/cylindrical gas-trapping features shown in FIG. 5a is given by equation (2) with $$r_W = 1 + \frac{4\pi}{\sqrt{3}\,f} \frac{H/a}{(2+b/a)^2}. \quad (6)$$

Figure 6:
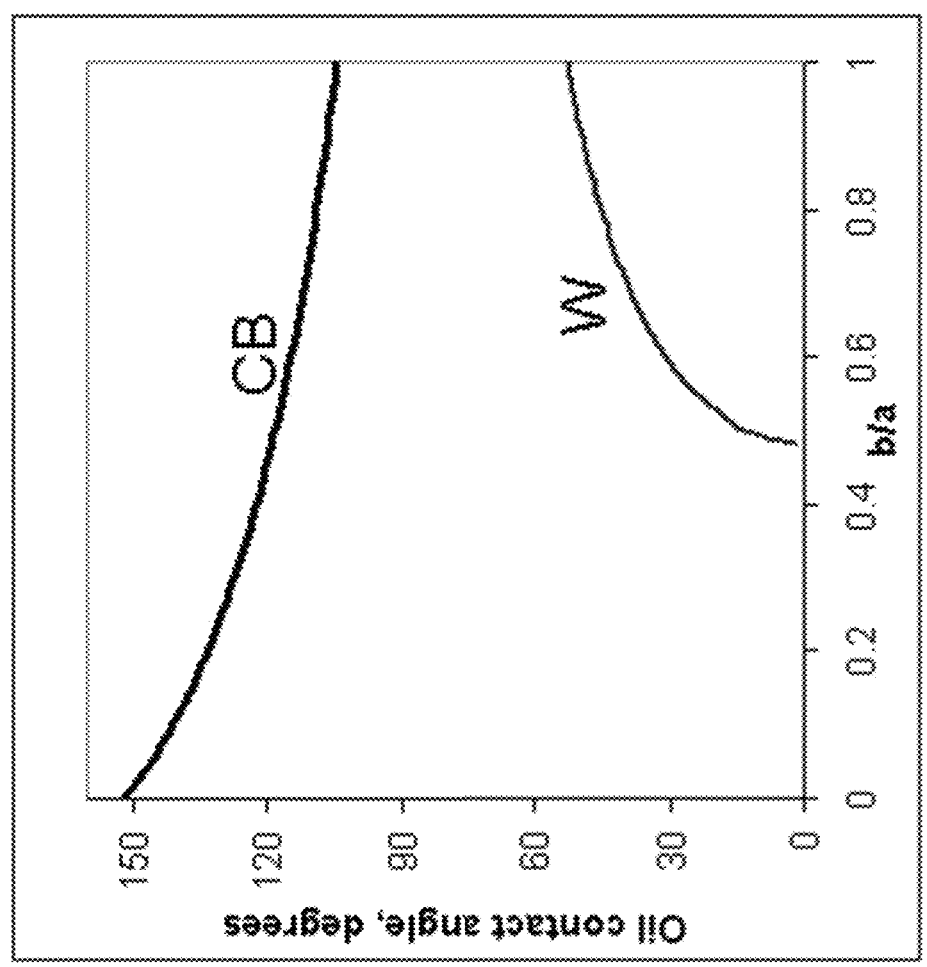

Contact angles calculated for Cassie-Baxter (CB) and Wenzel (W) states are plotted as a function of the b/a ratio in FIG. 6. In these specific, non-limiting examples, H/a=1 and the Young contact angle $\theta_Y$ is 80°. If the liquid 130 fully penetrates and floods the gas-trapping features 120, the Wenzel state is achieved. The overall contact angle would then be even smaller than the original Young contact angle $\theta_Y$, and the glass substrate 100 will become even more oleophilic than a comparable smooth glass substrate. However, full penetration of the gas-trapping features 120 will not occur where the gas-trapping features 120 are isolated from each other and are non-interacting features, such as those shown in FIGS. 2, 5a, and 5b. As previously described herein, the liquid meniscus 135 penetrates into the gas-trapping features 120 to a depth H and the gas molecules are physically trapped. Further penetration by the meniscus 135 compresses the gas molecules and raises the pressure of the trapped gas molecules.

Figure 4:
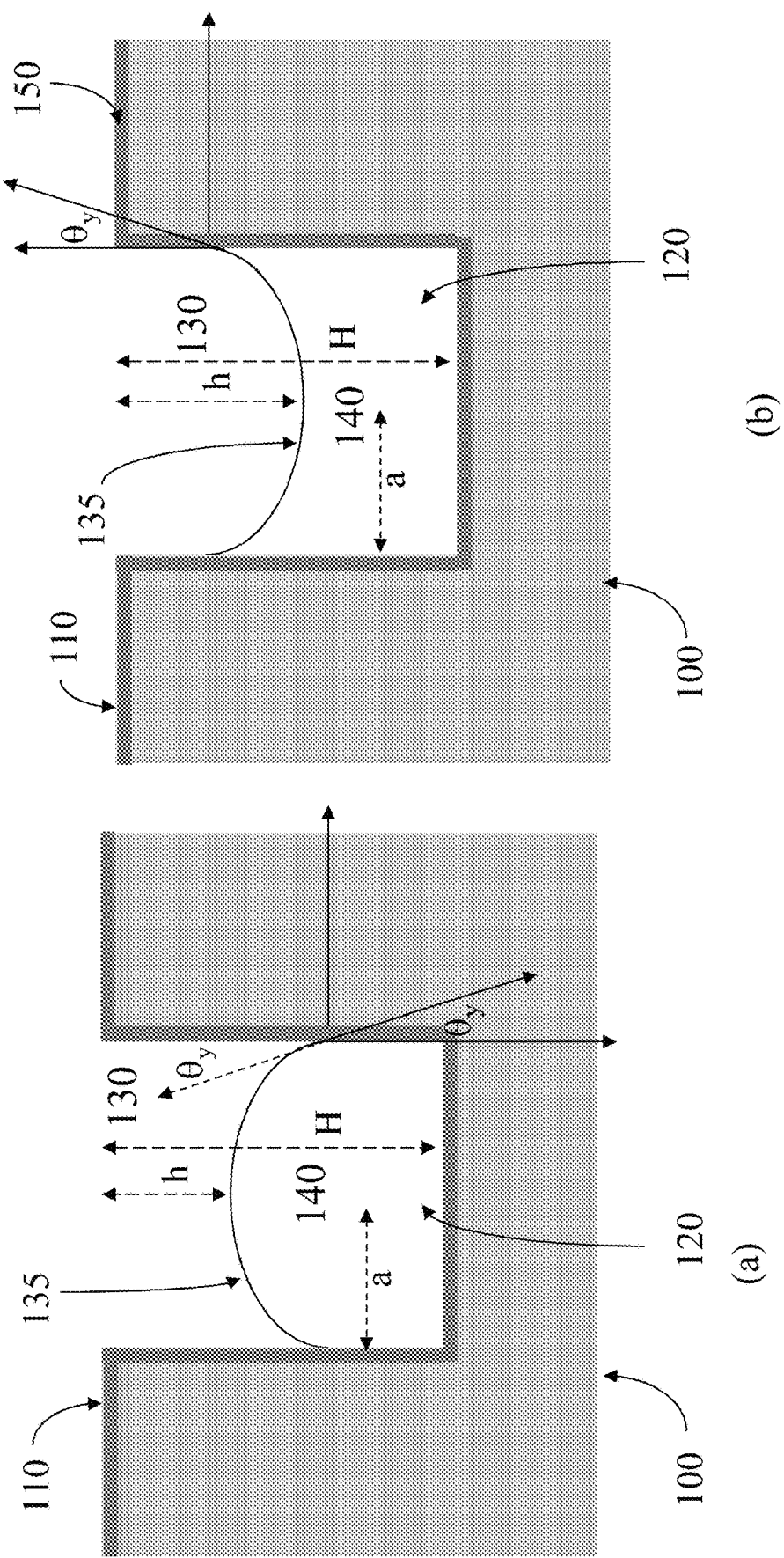
FIG. 4a is a schematic cross-sectional representation of the glass substrate of FIG. 3 in which a liquid meniscus having a downwardly concave shape is formed.
FIG. 4b is a schematic cross-sectional representation of the glass substrate of FIG. 3 in which a liquid meniscus having an upwardly concave shape is formed.

Referring to FIGS. 2a, 4a, and 5a, and assuming that the gas 140 follows the ideal gas law, the pressure of the entrapped gas is given by:

$$P_g(h) = \frac{P_{atm} V_{cav}}{V_g(h)} \quad (7)$$

for isothermal compression, where $P_g(h)$ and $V_g(h)$ are the pressure and the volume, respectively, of the gas 140, expressed as function of the penetration depth h; $P_{atm}$ is the atmospheric pressure; and $V_{cav}$ is the volume of the cylindrical cavity 120 (FIGS. 3 and 4). Here, $V_{cav}$ is the volume of the cavity which was initially fully occupied by gas and is given by the equation:

$$V_{cav} = \pi a^2 H \quad (8)$$

$V_g(h)$ is the volume of entrapped gas after the liquid meniscus has penetrated a distance h.

The volume of entrapped gas is given by:

$$V_g = \pi a^2 (H-h) + V_{cap} \quad (9)$$

The cap volume is the volume of gas under the hemispherical cap:

$$V_{cap} = \frac{\pi}{6} a^3 \left[ 3 \frac{1-\sin\theta_Y}{\cos\theta_Y} + \left(\frac{1-\sin\theta_Y}{\cos\theta_Y}\right)^3 \right] = \frac{\pi}{6} a^3 F(\theta_Y) \quad (10)$$

At equilibrium, force balance yields:

$$P_g(h^*) - P_\infty = \frac{2\sigma\cos\theta_Y}{a} \quad (11)$$

where $P_g(h^*)$ is the pressure in the entrapped gas, which is a function of the equilibrium distance h* that the meniscus could penetrate into the cavity/gas-trapping feature 120; P∞ is the atmospheric pressure; and a is the radius of the cylindrical cavity.

The solution of equilibrium penetration depth is given by:

$$\frac{h^*}{H} = \frac{2\sigma\cos\theta_Y}{aP_\infty + 2\sigma\cos\theta_Y} + \frac{aF(\theta_Y)}{6H} \quad (12)$$

where h* is the equilibrium penetration depth. The equilibrium penetration depth h* is the maximum depth that the liquid meniscus can penetrate into the cavity 120 before being stopped by the pressure of the compressed gas inside the cavity/gas-trapping feature 120.

Figure 7:
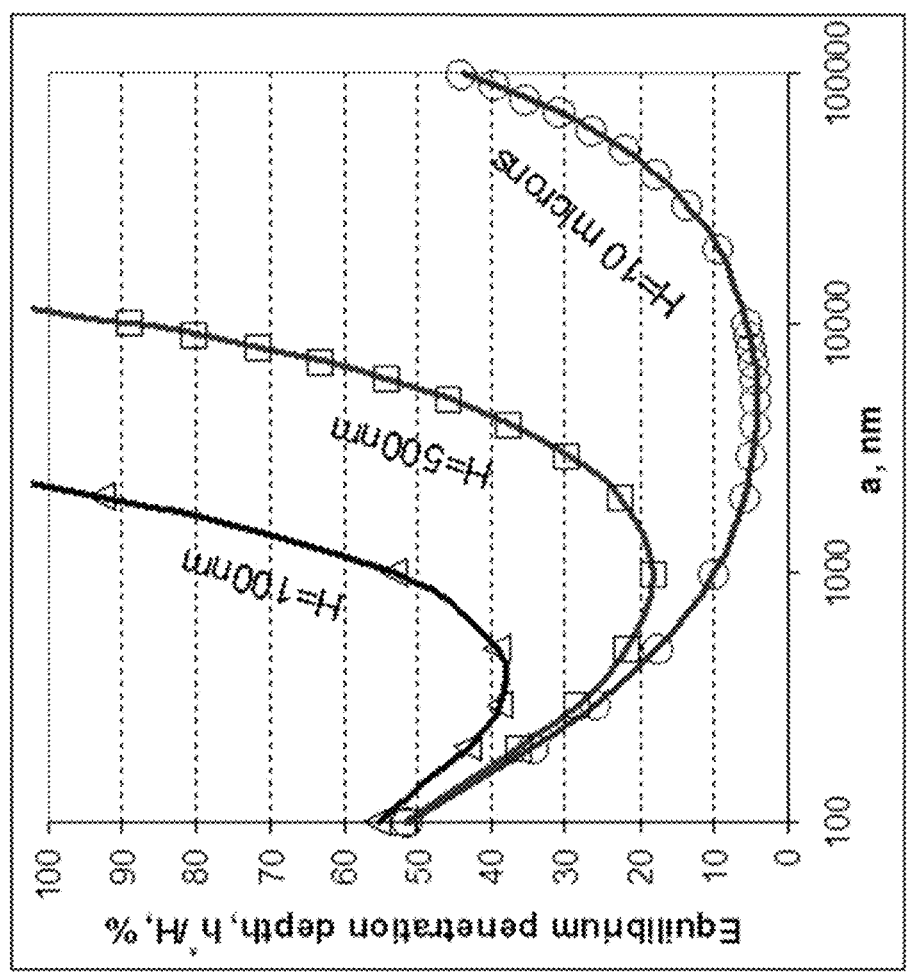
FIG. 7 is a plot of calculated equilibrium penetration depth as a function of cavity radius and height for cylindrical cavities.

The calculated equilibrium penetration depth h* for cylindrical cavities is shown in FIG. 7 as a function of cavity radius and height H. The cavity penetration depth is expressed as the percentage penetration (h*/H) of cavity height H. In general, larger cavity radius and smaller cavity depth lead to smaller penetration depth. The smaller depth and larger radius lead to a greater rate of increase of the pressure in the compressed gas as function of penetration depth. The greater the rise in pressure per unit penetration depth, the lower the penetration depth.

The pressure buildup in the compressed gas inside the cavities/gas-trapping features 120 thus stops the complete transition of fluid drops in these non-interacting cavities from the Cassie-Baxter state to into the Wenzel state. This assures the maintenance of a large surface fraction of the suspended liquid-air (i.e., gas) interface, although part of the interface can be suspended inside the cavity. As long as there is a high fraction of liquid-air interface, the contact angle would be high irrespective of whether the liquid-air interface is at the top of the cavity (i.e., a perfect Cassie-Baxter state) or partially inside the cavity. This partially invaded equilibrium state is also referred to herein as the partially wetted (PW) state.

This can be seen from the calculation of the overall contact angle corresponding to the equilibrium penetration depth h*, which can be calculated from equation (12). Once the value of h* is known, the overall contact angle of the partially wetted state could be approximately calculated as:

$$\cos\theta_{PW} = -1 + f(1 + r_f \cos\theta_Y) \quad (13)$$

with $$r_f = 1 + \frac{4\pi}{\sqrt{3}\,f} \frac{h^*/a}{(2+b/a)^2} \quad (14)$$

Figure 8:
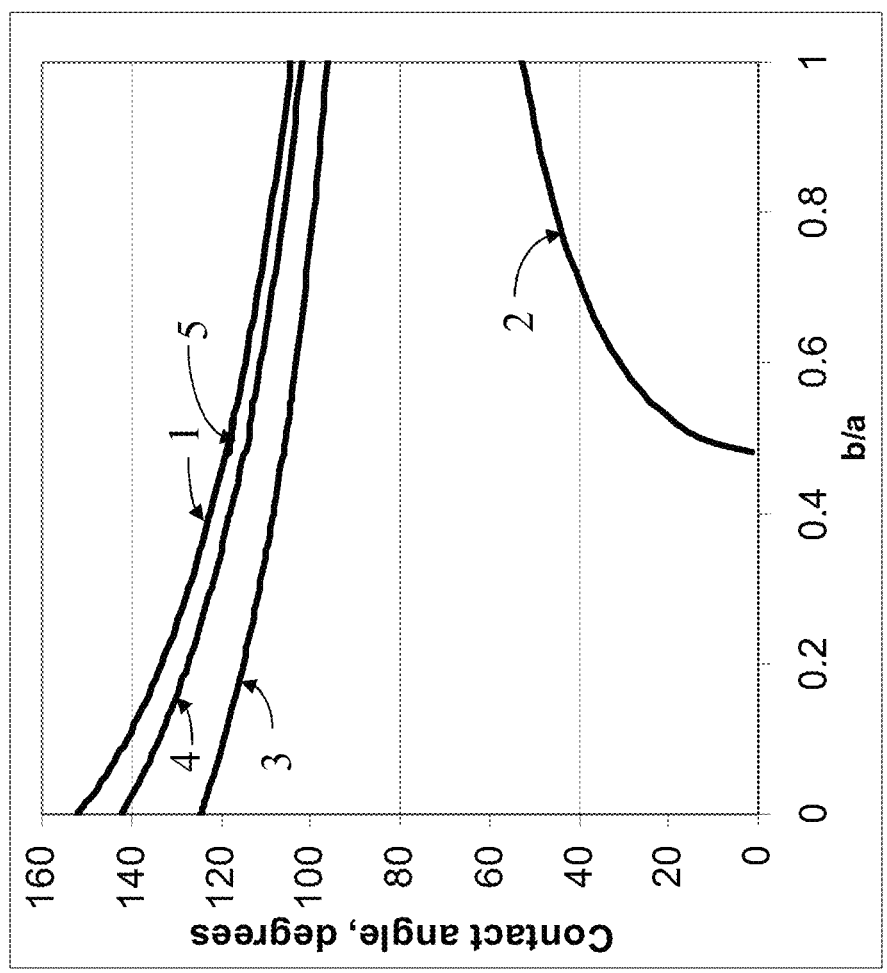
FIG. 8 is a plot of calculated contact angles as function of the b/a ratio for different cavity designs.

Calculated contact angles corresponding to various cavity designs are plotted as function of the b/a ratio in FIG. 8. Line 1 in FIG. 8 corresponds to the ideal Cassie-Baxter case where there is no penetration of the liquid meniscus into the cavities. This state offers the highest contact angle. Line 2 in FIG. 8 corresponds to the Wenzel state, which would occur if the oil had completely invaded and filled up the cavities. This state, which would occur in the absence of physically trapping gas, leads to low contact angles for oil and is therefore not desirable. Lines 3, 4, and 5 (line 5 overlaps line 1) in FIG. 8 correspond to the partially wetted states for cylinder radii of 100 nm, 1 μm, and 10 μm, respectively. The contact angle values corresponding to these PW states are close to that of the Cassie-Baxter state, even though oil has partially penetrated into the cavities. For the glass substrate to behave like an oleophobic and/or super-oleophobic surface, the behavior illustrated by lines 3, 4, and 5 in FIG. 8 is desirable. Maintaining contact angle values of oil close to the ideal Cassie-Baxter state using the surfaces described herein does not require any complex reentrant geometry, and is important for developing economically feasible smart surfaces with oil repellant properties.

Figure 9:
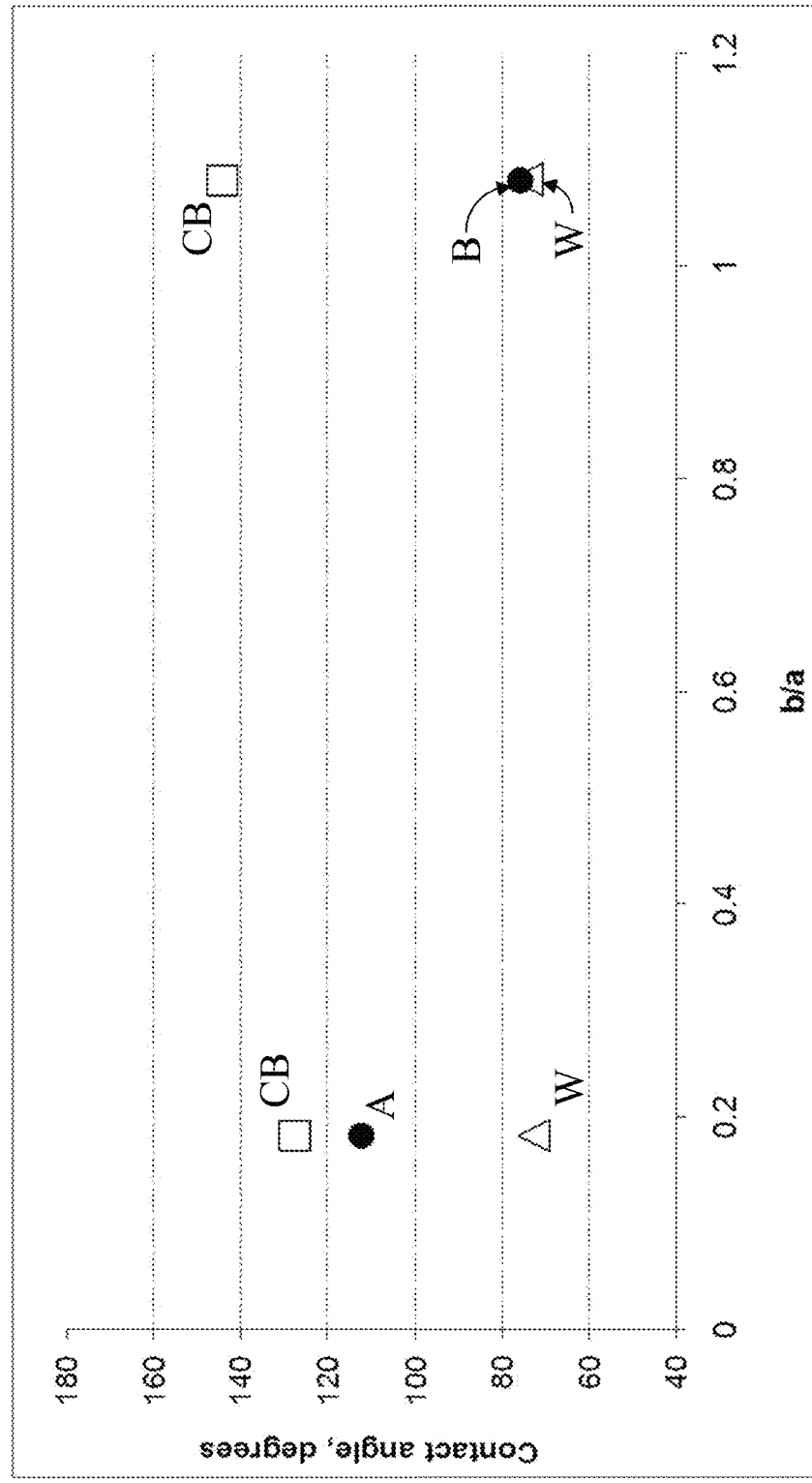
FIG. 9 is a plot of contact angles of oil droplets on substrate surfaces as a function of the ratio b/a, where b is the separation distance between adjacent features and a is the cross-sectional dimension of the features on the surface.

The contact angles obtained for oil droplets on a substrate having square or "waffle-like" gas-trapping features 120, such as those shown in FIG. 5b and for oil droplets on a surface that includes posts (as shown in FIGS. 2a and b) are plotted in FIG. 9 as a function of the b/a ratio of the features, where b is the separation distance of the gas trapping features 120, 420, or 300 to the cross-sectional dimension a of said features. The surface of the substrate having waffle-like gas-trapping features is oleophobic, producing a contact angle (A in FIG. 9) of approximately 110°. In contrast, the substrate having posts produces a contact angle (B in FIG. 9) of less than 80° and is therefore oleophilic. Contact angles calculated for the Wenzel (W in FIG. 9) and Cassie-Baxter (CB in FIG. 9) states are also plotted in FIG. 9 for the b/a ratios of the gas-trapping and post features. The contact angle B for the surface having a reentrant geometry is essentially the same as the contact angle W predicted for the Wenzel state, whereas contact angle A is closer to the contact angle CB predicted for the Cassie-Baxter state than contact angle W, thus indicating that transition of the oil droplets form the Cassie-Baxter state to the Wenzel state has been stopped and that the surface is only partially wetted.

In some embodiments, gas-trapping features 120 are cavities or depressions that are formed by laser ablation of portions of the surface of the glass substrate. When formed by a continuous wave laser such as a $CO_2$, YAG, or UV excimer laser, material is ablated in a thermal ablation mode and the surfaces of the depressions or cavities are fire polished. The formation of depressions by laser ablation is described in commonly-assigned U.S. Patent Application Publication No. 2008/0047940, filed on Jun. 20, 2007, by Xinghua Li et al. and entitled "Article with Multiple Surface Depressions and Method for Making the Same," the contents of which are incorporated herein by reference in their entirety as if fully set forth below.

In other embodiments, the gas-trapping features 120 (e.g., depressions, cavities, holes, and the like) are formed by embossing a surface of the glass substrate. The embossing process includes heating a glass substrate to a temperature at which the viscosity of the glass is in a range from about $10^5$ poise to about $10^8$ poise. For a glass substrate, this temperature is typically near the softening point (i.e., the temperature at which the viscosity of the glass is $10^{7.6}$ poise) of the glass. The softened surface is brought into contact with a textured or templated surface of a mold at some predetermined load to transfer an impression of the textured surface into the glass surface. To produce gas-trapping features such as those described herein, the surface of the mold, in one embodiment, comprises a plurality of protrusions. In some embodiments, the protrusions (or texture of the mold) are arranged in a regular array. The embossed surface of the glass substrate is typically a continuous surface that is free of any undercutting or fracture surfaces that typically comprise a reentrant geometry. The dimensions (e.g., laterally varying orientation and depth) of the gas-trapping features can be controlled by controlling the pressure exerted by the mold on the glass substrate during embossing. Embossing of glass substrates is described in commonly-assigned U.S. Patent Application Publication No. 2010/0279068, filed on Nov. 24, 2009, by Glen Bennett Cook et al. and entitled "Embossed Glass Articles for Anti-Fingerprinting Applications and Methods of Making," the contents of which are incorporated herein by reference in their entirety as if fully set forth below.

In still other embodiments, the gas-trapping features 120 (e.g., depressions, cavities, holes, and the like) can be formed by creating a patterned coating on the surface 110 of the glass substrate 100. This can be accomplished by placing a mask, which serves as a pattern for the general shape and contours of the gas-trapping features 120, on or over the surface 110 of the glass substrate 100. Next, a coating can be disposed on the surface 110 with the mask thereon, followed by a step of removing the mask. In this manner, the voids created by removal of the mask results in a patterned coating that defines the gas-trapping features 120.

In exemplary implementations of such a technique, the mask can be created by using colloidal particles, which are coated onto the surface 110 of the glass substrate 100 using a solution-based technique (e.g. dip-coating, spin-coating, spray-coating, inkjetting, or the like). The particles generally will have an average cross-sectional dimension of about 50 nm to about 10 µm. If the particles are sufficiently sized and spaced apart such that a low proportion of the particles remain in contact with an adjacent particle, then collectively they can serve as the mask. That is, given that the particles will serve as the pattern for the shape and contours (i.e., cross sectional dimension a) of the gas-trapping features 120 and that the interstices between particles will serve as the separation distance b between gas-trapping features 120, the particles should be sized and spaced apart in such a manner as described hereinabove to permit the desired Cassie-Baxter state. Thus, in general, the particles, as a whole, should not be close-packed such that there is too little of a separation distance b (i.e., less than about 10 nm) between a significant majority of the particles or such that the cross-section a of a significant majority of the aggregated/contacting particles is too large (i.e., greater than about 100 µm).

Once the particles have been disposed on the surface, they can be subjected to an optional size reduction step. The optional size reduction step can be used to simultaneously decrease the size of the particles to ensure that the cross sectional dimension a of the particles (including any aggregated/contacting particles) is sufficiently small and to increase the spacing (separation distance b) between the particles. The size reduction step can be accomplished using, for example, an etching process (i.e., wet chemical etching, dry/gas-induced etching, or a combination thereof). In scenarios where the size reduction step is implemented, the size-reduced particles serve as the final mask.

Once the mask has been prepared, the mask-covered surface 110 can be coated with a material that will remain on the surface 110 to provide the requisite patterning for the gas-trapping features 120 that will be formed when the mask is subsequently removed. In general, the coating can be fabricated using any of the variants of chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, inkjetting, sol-gel processing, or the like. Such processes are known to those skilled in the art to which this disclosure pertains. The thickness of the coating generally will serve as the height or depth H of the gas-trapping features 120. Thus, the thickness of the coating should be controlled so as to permit the desired Cassie-Baxter state as described above.

After disposing the coating on the surface 110, the particles are selectively removed. This step can be accomplished by a variety of techniques known to those skilled in the art to which this disclosure pertains. These particle-removal techniques include, for example, chemical removal (e.g., by a solvent or reactant that preferentially removes the particles), thermal removal (e.g., sufficient heat to preferentially melt or decompose the particles), radiant energy removal (e.g., using a laser, electron beam, or the like, to preferentially melt, decompose, or ablate the particles), or the like. When the particles are removed, the remaining coating will have openings or cavities therein that correspond to the desired gas-trapping features 120.

Using such a methodology, the patterned coating with the gas-trapping features 120 therein can also provide additional desirable properties. For example, if the feature size of the coating/gas-trapping features 120 are sufficiently small, the glass substrate 100 can exhibit low light scattering properties (e.g., anti-reflection/reflection-resistant, anti-glare/glare-resistant, or other like properties), low haze, high transmission, and the like. These properties can be particularly beneficial if the glass substrate 100 is implemented in a touch screen or display device.

In some embodiments, the glass substrate is an alkali aluminosilicate glass. In one embodiment, the alkali aluminosilicate glass substrate comprises, consists essentially of, or consists of: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the alkali metal modifiers are alkali metal oxides. In another embodiment, the alkali aluminosilicate glass substrate comprises, consists essentially of, or consists of: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In yet another embodiment, the alkali aluminosilicate glass substrate comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %. In another embodiment, the alkali aluminosilicate glass substrate comprises, consists essentially of, or consists of: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % MgO; and 0-5 mol % CaO, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)−$Al_2O_3$≥2 mol %; 2 mol %≤$Na_2O$−$Al_2O_3$≤6 mol %; and 4 mol %≤($Na_2O$+$K_2O$)−$Al_2O_3$≤10 mol %. In yet another embodiment, the alkali aluminosilicate glass comprises, consists essentially of, or consists of: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % (MgO+CaO+SrO+BaO); 0-3 wt % (SrO+BaO); and 0-5 wt % ($ZrO_2$+$TiO_2$), wherein 0≤($Li_2O$+$K_2O$)/$Na_2O$≤0.5.

The alkali aluminosilicate glass is, in some embodiments, substantially free of lithium, whereas in other embodiments, the alkali aluminosilicate glass is substantially free of at least one of arsenic, antimony, and barium. In some embodiments, the glass article is down-drawn, using those methods known in the art such as, but not limited to fusion-drawing, slot-drawing, re-drawing, and the like, and has a liquid viscosity of at least 135 kpoise.

Non-limiting examples of such alkali aluminosilicate glasses are described in commonly-assigned U.S. Patent Application Publication No. 2008/0286548, by Adam J. Ellison et al., entitled "Down-Drawable, Chemically Strengthened Glass for Cover Plate," filed on Jul. 31, 2007; U.S. Patent Application Publication No. 2009/0142568, by Matthew J. Dejneka et al., entitled "Glasses Having Improved Toughness and Scratch Resistance," filed on Nov. 25, 2008; U.S. Patent Application Publication No. 2009/0215607, by Matthew J. Dejneka et al., entitled "Fining Agents for Silicate Glasses," filed Feb. 25, 2009; U.S. Patent Application Publication No. 2009/0220761, by Matthew J. Dejneka et al., entitled "Ion-Exchanged, Fast Cooled Glasses," filed Feb. 25, 2009; U.S. Patent Application Publication No. 2010/0035038, by Kristen L. Barefoot et al., entitled "Strengthened Glass Articles and Methods of Making," filed Aug. 7, 2009; U.S. Patent Application Publication No. 2011/0201490, by Kristen L. Barefoot et al., entitled "Crack and Scratch Resistant Glass and Enclosures Made Therefrom," filed Aug. 18, 2010; and U.S. Patent Application Publication No. 2011/0045961, by Matthew J. Dejneka et al., entitled "Zircon Compatible Glasses for Down Draw," filed Aug. 16, 2010; the contents of each of which are incorporated herein by reference in their entireties as if fully set forth below.

In certain embodiments, the glass substrate can be thermally or chemically strengthened (e.g. by ion exchange) before or after formation of the gas-trapping features 120. The strengthened glass substrate has strengthened surface layers extending from a first surface and a second surface to a depth of layer below each surface. The strengthened surface layers are under compressive stress, whereas a central region of the glass substrate is under tension, or tensile stress, so as to balance forces within the glass. In thermal strengthening (also referred to herein as "thermal tempering"), the glass substrate is heated up to a temperature that is greater than the strain point of the glass but below the softening point of the glass and then rapidly cooled to a temperature below the strain point to create strengthened layers at the surfaces of the glass substrate. In another embodiment, the glass substrate can be strengthened chemically by a process known as ion exchange. In this process, ions in the surface layer of the glass are replaced by—or exchanged with—larger ions having the same valence or oxidation state. In those embodiments in which the glass substrate comprises, consists essentially of, or consists of an alkali aluminosilicate glass, ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes typically comprise immersing the glass substrate or article in a molten salt bath containing the larger ions to be exchanged with the smaller ions in the glass. It will be appreciated by those skilled in the art that parameters for the ion exchange process including, but not limited to, bath composition, bath temperature, immersion time, the number of immersions of the glass in a salt bath (or baths), use of multiple salt baths, additional steps such as annealing, washing, and the like, are generally determined by the composition of the glass and the desired depth of layer and compressive stress of the glass to be achieved by the strengthening operation. By way of example, ion exchange of alkali metal-containing glasses may be achieved by immersion in at least one molten salt bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 lam up to at least 50 μm with a compressive stress ranging from about 200 MPa up to about 800 MPa, and a central tension of less than about 100 MPa.

Non-limiting examples of ion exchange processes are provided in the U.S. patent applications and provisional patent applications that have been previously referenced hereinabove. Additional non-limiting examples of ion exchange processes in which glass is immersed in multiple ion exchange baths, with washing and/or annealing steps between immersions, are described in commonly-assigned U.S. Patent Application Publication No. 2010/0009154, by Douglas C. Allan et al., entitled "Glass with Compressive Surface for Consumer Applications," filed Jul. 10, 2009, in which glass is strengthened by immersion in multiple, successive, ion exchange treatments in salt baths of different concentrations; and U.S. Patent Application Publication No. 2010/0028607, by Christopher M. Lee et al., entitled "Dual Stage Ion Exchange for Chemical Strengthening of Glass," filed Jul. 28, 2009, in which glass is strengthened by ion exchange in a first bath is diluted with an effluent ion, followed by immersion in a second bath having a smaller effluent ion concentration than the first bath. The contents of these commonly-assigned U.S. Patent Applications are incorporated herein by reference in their entireties as if fully set forth below.

Figure 10:
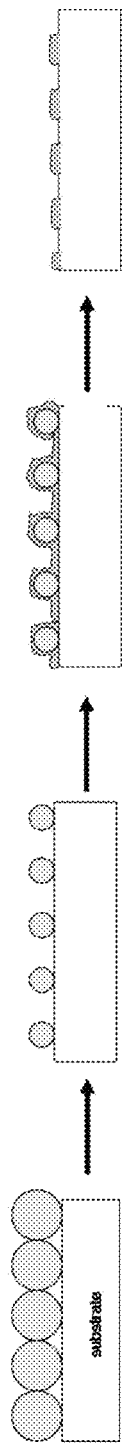
FIG. 10 is a schematic illustration of a process for producing a glass article having an oleophobic surface formed from a patterned coating.

In a specific embodiment that might be particularly advantageous for applications such as touch-accessed or -operated electronic devices, an oleophobic glass article is formed using a chemically strengthened (ion exchanged) alkali aluminosilicate flat glass sheet. The oleophobicity is imparted by producing a patterned coating on one surface of the alkali aluminosilicate glass sheet, which has an average thickness of less than or equal to about 1 millimeter (mm). The patterned coating can be prepared on the ion-exchanged alkali aluminosilicate glass sheet using a four-step process such as the one shown in FIG. 10.

First, a dispersion of polymer beads (e.g., polystyrene latex beads) in water is spin coated or dip coated onto the glass sheet. Next, the polymer beads are exposed to an oxygen plasma etching step to reduce the size of, and increase the spacing between, the beads. In the next step, a thin coating (having an average thickness of less than or equal to about 200 nm) is sputtered on the bead-covered glass surface. The coating is formed from an oxide material (e.g., one of the constituents of the glass composition, SiO, or the like). Finally, the polymer beads are dissolved from the surface of the glass by immersing the coated glass into an ultrasonicated solvent bath, wherein the polymer beads are at least partially soluble in the solvent while the coating material and the glass sheet are at least partially insoluble in the solvent such that the solvent preferentially dissolves/ removes the polymer beads from the surface of the glass sheet. What remains is a patterned coating having non-interacting gas-trapping features therein.

Such a coated article can be used in the fabrication of a touch screen display for an electronic device. The coated article can have an optical transmittance of at least about 94% and a haze of less than 0.5%. During operation, the coated article can exhibit oleophobic and hydrophobic behavior. That is, the coated article can have a contact angle with oleic acid of greater than about 90° and a contact angle with water of greater than or equal to about 110°. In addition, the coated article can exhibit anti-reflection behavior. That is, the single-side pattern-coated article can have a total reflectance of less than or equal to about 7% across the visible spectrum (i.e., about 380 nm to about 750 nm), wherein the glass sheet has a total reflectance of less than or equal to about 8% without any coating thereon.

The various embodiments of the present disclosure are further illustrated by the following non-limiting examples.

EXAMPLES

Example 1

Fabrication of Oleophobic Coatings on Flat Glass Substrates

In this example, oleophobic coatings were prepared on flat glass substrates. The substrates chosen were ion exchanged alkali aluminosilicate glass sheets having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$.

Polystyrene (PS) latex beads having various sizes (i.e., about 260 nm and about 520 nm average diameters) were obtained as 10 weight percent (wt %) dispersions in water from Microgenics Corporation (Thermo-Fisher Scientific). The 260 nm PS dispersions was used as-is and was coated onto plasma treated glass samples using a commercial spin coater. The spin-coating step consisted of two stages: (i) about 250 revolutions per minute (rpm) for 5 seconds to spread the bead solution evenly, and (ii) about 3000 rpm for about 10 seconds to remove the excess bead solution. The 260 nm PS coated surfaces of the substrates reflected an orange color under ambient lighting.

Figure 11:
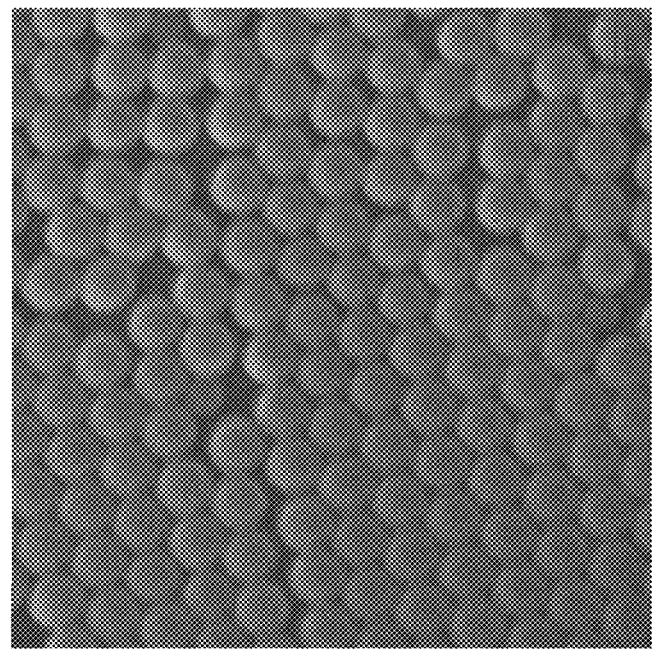
FIG. 11 is a SEM image of a glass sample coated with polystyrene latex beads in accordance with EXAMPLE 1.

The 520 nm PS dispersion was concentrated to about 20 wt % PS and yielded a homogenously coated substrate using the above spin conditions. These substrates reflected a purple color under ambient lighting. FIG. 11 provides an SEM image of a representative glass sample coated with the 520 nm PS beads.

Figure 12:
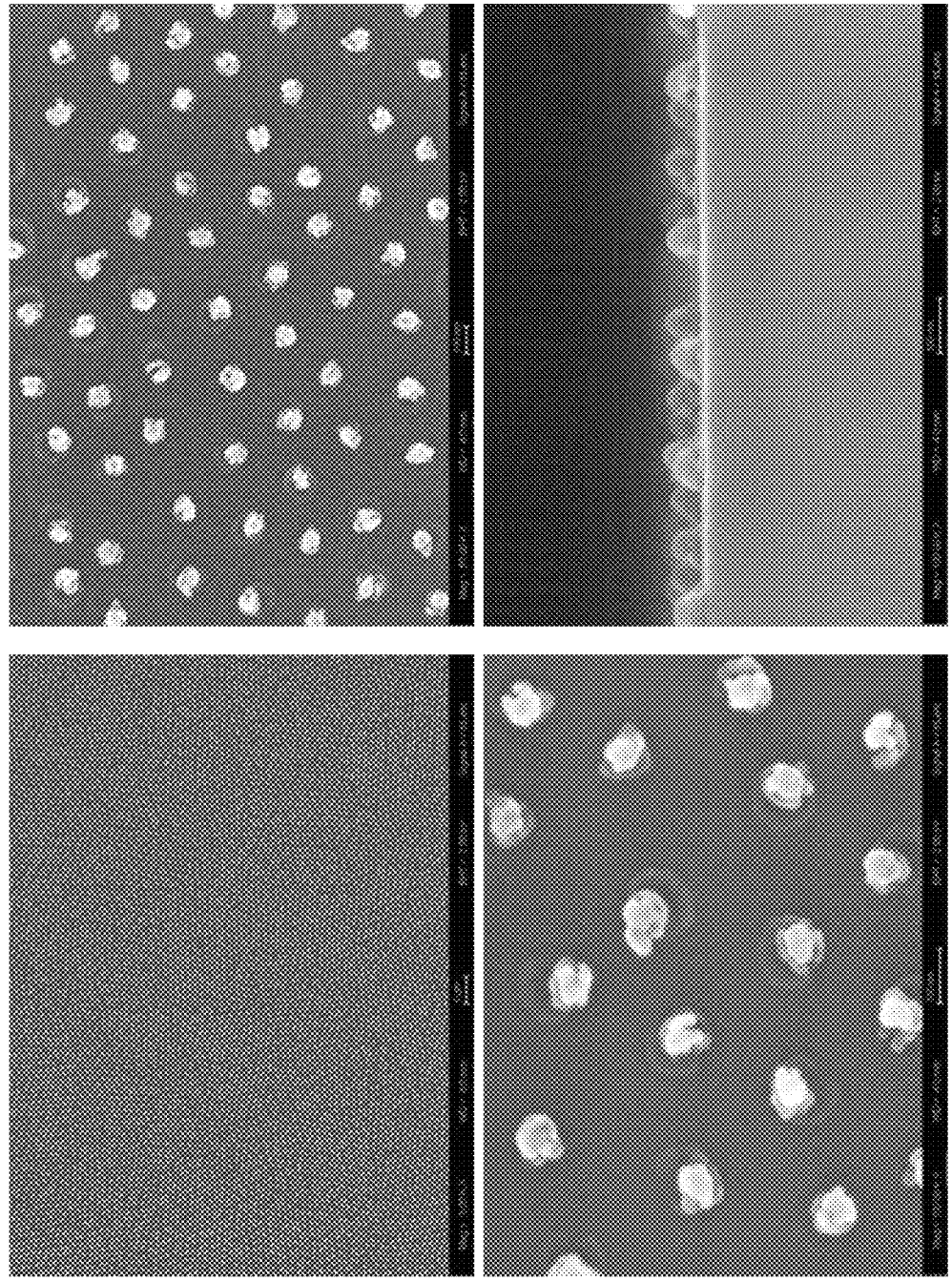
FIG. 12 includes low and high magnification SEM images of a glass sample coated with etched polystyrene latex beads in accordance with EXAMPLE 1.

The diameters of the PS beads were reduced using a reactive ion etching (RIE) step or a plasma etching step. The RIE step entailed exposing the PS-coated samples with about 43 standard cubic centimeters (sccm) of oxygen and about 29 sccm of $CHF_3$ at a pressure of about 80 millitorr (mTorr) and a power of about 80 Watts (W). The plasma etching step entailed exposing the PS-coated samples with an oxygen plasma source with a power of about 80 W. The etch times were varied up to about 450 seconds (e.g., etch times of 0, 30, 60, 180, 300, 450 seconds were studied). FIG. 12 includes low and high magnification SEM images of representative PS-coated (520 nm) glass samples after reactive ion etching.

Figure 13:
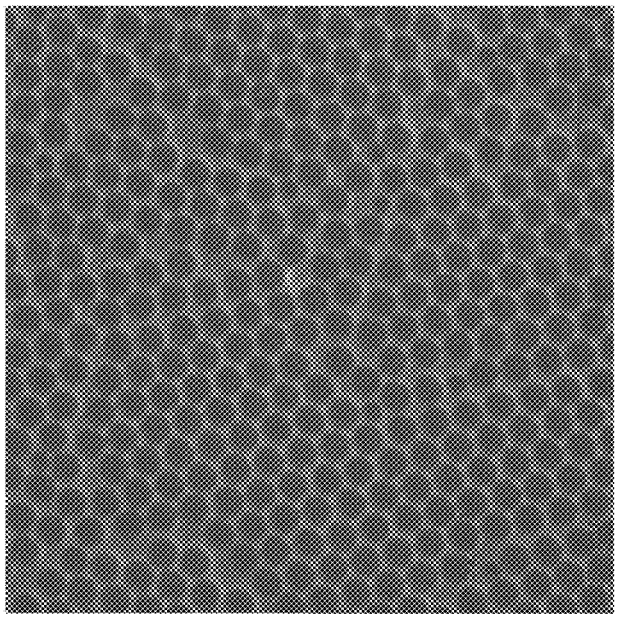
FIG. 13 includes low and high magnification SEM images of a patterned SiO coating formed on a glass sample after removal of polystyrene latex beads in accordance with EXAMPLE 1.
Figure 13:
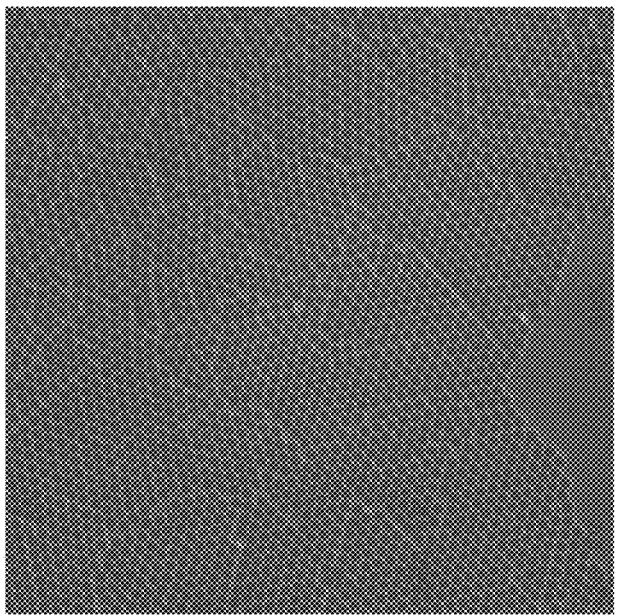

After the size-reduction step, a SiO (Cerac, WI, USA) film was evaporated, in vacuum, onto the surfaces using Tantalum baffle boats (RD Mathis, CA, USA). The films thicknesses were typically one-third of the particle height residing on the surface after the size-reduction step (i.e., the coatings had an average thickness of about 40 nm to about 170 nm). After sputtering, the coated surfaces were immersed in a tetrahydrofuran solvent bath and ultrasonicated (Model 2510, Branson, USA) until the beads dissolved off, which generally took less than about 10 minutes. FIG. 13 includes low and high magnification SEM images of representative patterned coatings formed on the glass samples after removal of the PS beads. The patterned coatings provide non-interacting gas-trapping cavities across the surface of the glass sheet.

The contact angles of water and oleic acid were measured for a variety of samples. The samples generally exhibited hydrophobic or almost-superhydrophobic behavior, as well as oleophobic behavior. For samples had etch times that were less than or equal to about 5 minutes and had SiO coating thicknesses averaging greater than or equal to 75 nm, regardless of PS bead size, the water contact angles ranged from about 135° to about 141°, and the oleic acid contact angles ranged from about 94° to about 103°. The samples that underwent either no etching or the longest etch times (i.e., those with 450 second etch times), regardless of PS bead size, exhibited hydrophobic behavior, but slightly-oleophilic behavior (i.e., oleic acid contact angles from about 76° to about 86°).

In addition, reflectance spectra were taken for a variety of samples. Each of the samples exhibited anti-reflective behavior, meaning that the total reflectance of the single-side-coated glass articles had a lower total reflectance than an uncoated reference sample of glass across the visible spectrum.

Finally, the fingerprint resistance of a variety of samples was qualitatively studied. Each of the samples exhibited significantly improved fingerprint resistance (i.e., less transfer of synthetic fingerprint oil/sebum as applied by a mechanical fingerprint stamp) relative to an uncoated reference glass sample.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

The invention claimed is:

1. An oleophobic article, comprising:
   a glass substrate comprising a flat surface; and
   a patterned oleophobic coating, disposed on the flat surface of the glass substrate, comprising a plurality of non-interacting adjacent gas-trapping features separated by a distance b, wherein each gas-trapping feature comprises an opening in an outer surface of the patterned oleophobic coating that extends to a depth below the outer surface, each opening having a cross-sectional dimension a, wherein an average a is about 10 nanometers to about 100 micrometers so that when a liquid drop contacts the flat surface, the liquid drop forms a liquid meniscus having a concave shape that traps the gas within the gas-trapping features and compresses the gas that is trapped within the gas-trapping features and wherein the patterned oleophobic coating imparts oleophobicity to the glass substrate.

2. The oleophobic article of claim 1, wherein each gas-trapping feature comprises an isolated cavity defined by at least one wall and a floor, and wherein each opening physically traps gas when a liquid is located on the outer surface.

3. The oleophobic article of claim 1, wherein the outer surface has an open fraction in a range from about 0.40 to about 0.95.

4. The oleophobic article of claim 1, wherein_the plurality of non-interacting adjacent gas-trapping features are not in fluid communication with each other.

5. The oleophobic article of claim 1, wherein each opening extends into the patterned oleophobic coating to a depth H, and wherein an average H is about 10 nanometers up to about 100 micrometers.

6. The oleophobic article of claim 1, wherein an average b is about 10 nanometers to about 50 micrometers.

7. The oleophobic article of claim 1, wherein the glass substrate comprises an alkali aluminosilicate glass.

8. The oleophobic article of claim 1, wherein the patterned oleophobic coating is formed from an oxide material.

9. The oleophobic article of claim 1, wherein the oleophobic article is hydrophobic.

10. The oleophobic article of claim 1, wherein the oleophobic article exhibits a total reflectance over a visible light spectrum that is lower than a total reflectance of the glass substrate without the patterned oleophobic coating disposed thereon.

11. An oleophobic article, comprising:
    a chemically strengthened alkali aluminosilicate glass substrate comprising a flat surface; and
    a patterned oleophobic coating of an oxide material, disposed on the flat surface of the chemically strengthened alkali aluminosilicate glass substrate, comprising a plurality of non-interacting gas-trapping features, wherein the patterned oleophobic coating imparts oleophobicity to the glass substrate;
    wherein each gas-trapping feature comprises an opening in an outer surface of the patterned oleophobic coating that extends to a depth below the outer surface;
    wherein the outer surface has an open fraction in a range from about 0.40 to about 0.95;
    wherein each opening has a cross-sectional dimension a, and wherein an average a is about 10 nanometers to about 100 micrometers;
    wherein each opening extends into the patterned oleophobic coating to a depth H, and wherein an average H is about 10 nanometers up to about 100 micrometers; and
    wherein adjacent gas-trapping features in the patterned oleophobic coating are separated by a distance b, and wherein an average b is about 10 nanometers to about 50 micrometers so that when a liquid drop contacts the flat surface, the liquid drop forms a liquid meniscus having a concave shape that traps the gas within the gas-trapping features and compresses the gas that is trapped within the gas-trapping features.

12. The oleophobic article of claim 11, wherein the oleophobic article is hydrophobic.

13. The oleophobic article of claim 11, wherein the oleophobic article exhibits a total reflectance over a visible light spectrum that is lower than a total reflectance of the glass substrate without the patterned oleophobic coating disposed thereon.

14. The oleophobic article of claim 2, wherein adjacent gas-trapping features in the patterned oleophobic coating are separated by a distance b, and there is a ratio of b/a such that when oil is placed in contact with the oleophobic article, there is a contact angle greater than or equal to 90°.

15. The oleophobic article of claim 11, wherein there is a ratio of b/a such that when oil is placed in contact with the oleophobic article, there is a contact angle greater than or equal to 90°.

16. The oleophobic article of claim 1, wherein the gas-trapping features comprise an array of adjacent holes, the holes comprising a shape selected from the group consisting of cylindrical holes, polygonal holes, trapezoidal holes, triangular holes, diamond holes, square holes and rectangular holes.

17. The oleophobic article of claim 16, wherein the article comprises an array of square gas-trapping features mimicking the appearance of a waffle.

18. The oleophobic article of claim 11, wherein the gas-trapping features comprise an array of adjacent holes, comprising a shape selected from the group consisting of cylindrical holes, polygonal holes, trapezoidal holes, triangular holes, diamond holes, square holes and rectangular holes.

19. The oleophobic article of claim 18, wherein the article comprises an array of square gas-trapping features mimicking the appearance of a waffle.

\* \* \* \* \*

UNITED STATES PATENT AND TRADEMARK OFFICE
CERTIFICATE OF CORRECTION

PATENT NO. : 10,898,933 B2  
APPLICATION NO. : 13/905367  
DATED : January 26, 2021  
INVENTOR(S) : Adra Smith Baca et al.

Page 1 of 1

It is certified that error appears in the above-identified patent and that said Letters Patent is hereby corrected as shown below:

In the Claims

In Column 18, Line 7, Claim 4, delete "wherein_the" and insert -- wherein the --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*